US009232362B2

(12) United States Patent
Bekiares et al.

(10) Patent No.: US 9,232,362 B2
(45) Date of Patent: Jan. 5, 2016

(54) PROGRAMMING SECONDARY COMMUNICATION GROUPS TO DEVICES ARRANGED IN A HIERARCHY OF GROUPS

(71) Applicant: Motorola Solutions, Inc., Schaumburg, IL (US)

(72) Inventors: Tyrone D. Bekiares, Park Ridge, IL (US); Trent J. Miller, West Chicago, IL (US); Bruce D. Mueller, Palatine, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 364 days.

(21) Appl. No.: 13/730,918

(22) Filed: Dec. 29, 2012

(65) Prior Publication Data

US 2014/0187280 A1    Jul. 3, 2014

(51) Int. Cl.
*H04W 4/08* (2009.01)
*H04W 4/22* (2009.01)

(52) U.S. Cl.
CPC . *H04W 4/08* (2013.01); *H04W 4/22* (2013.01)

(58) Field of Classification Search
CPC ..................................................... H04W 4/08
See application file for complete search history.

(56) References Cited

U.S. PATENT DOCUMENTS 8,010,102 B2    8/2011    Glick et al.
8,271,631 B1    9/2012    Horvitz et al.
8,375,422 B2 *  2/2013    Sennett ................... G06F 21/88
                                                      455/410
8,473,549 B2    6/2013    Drozt et al.
2002/0067710 A1* 6/2002   Helm .................. H04L 12/5695
                                                       370/338
2008/0057992 A1  3/2008   Griffin
2009/0276461 A1 11/2009   Kuehner et al.
2011/0151917 A1  6/2011   Mao et al.

OTHER PUBLICATIONS

Hawkins, D., "Communications in the Incident Command System," COPS Interoperable Communications Technology Program, Issue Brief, No. 2, pp. 1-12, May 2007.
PCT Invitation to Pay Additional Fees for Counterpart Application PCT/US2013/071940 Mailed on May 13, 2014.
PCT International Search Report for Counterpart Application PCT/US2013/071940 Mailed on Jul. 23, 2014.

* cited by examiner

*Primary Examiner* — Bobbak Safaipour
(74) *Attorney, Agent, or Firm* — Kenneth A. Haas

(57) ABSTRACT

Primary and/or secondary communication groups can be assigned to users with communication devices arranged in a hierarchy (FIG. 4). A set of humans are assigned to a role in a role-based hierarchy. A communication device (404) is assigned to the set of humans for communication over a network. One or more secondary communication groups are determined for the communication device (120). The one or more determined secondary communication groups are primary communication groups of other devices used by one or more other humans assigned roles in the role-based hierarchy. Secondary communication group settings are programmed for the communication device (124), where the group settings are consistent with the determined secondary communication groups.

10 Claims, 7 Drawing Sheets

PROGRAMMING SECONDARY COMMUNICATION GROUPS TO DEVICES ARRANGED IN A HIERARCHY OF GROUPS

FIELD OF THE DISCLOSURE

The present disclosure relates generally to communication groups, and more particularly to programming secondary communication groups to devices whose associated users are arranged in a hierarchy of user groups.

BACKGROUND

When incidents such as natural disasters, crime investigations, and wildfires occur, responding to these incidents effectively can save lives, prevent damage, and limit injuries. To prepare for, prevent, respond to, and recover from incidents, the National Incident Management System (NIMS) was developed. NIMS can provide a consistent nationwide approach for all levels of government to work together regardless of cause, size, or complexity. NIMS can include an Incident Command System (ICS) which standardizes incident organizational structure for on-scene management of incidents. The ICS is an example where user groups of users are established. It can incorporate a Unified Command (UC) approach, whereby individuals can be designated by their jurisdictional authorities to jointly determine objectives, plans and priorities, as well as work together to execute them.

During incident preparation and/or response, there is a need to rapidly align all electronic communication (e.g., PTT, Video, Conferencing, Voice, Imaging, Data, etc.) with the ICS organizational chart, which is a role-based hierarchy of groups of one or more users, where each user group is associated with the same role. Communication groups are assigned to each user group. In one example, responders performing the same role at the incident are assigned, or affiliated, to the same primary communication group. This primary communication group facilitates communication between all responders performing the same role. One or more responders in each group may be further designated as a leader of that group. As a group leader, such users must also monitor, or scan, the primary communication groups of hierarchical user groups subordinate and peer to their own; such groups are referred to as the leader's secondary communication groups. This permits the leader to maintain situational awareness of the user groups subordinate and peer to him or her in the hierarchy. These primary and secondary communication group assignments must then be dynamically programmed into the applicable narrowband and/or broadband communication devices carried by the responders. Currently, these devices must be manually programmed with these group configurations. This can be a slow process and subject to error, costing valuable time during an emergency. Similarly, situations outside of incident response exist where a set of communication devices associated with users arranged into hierarchical user groups are to be programmed with primary and secondary communication groups.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
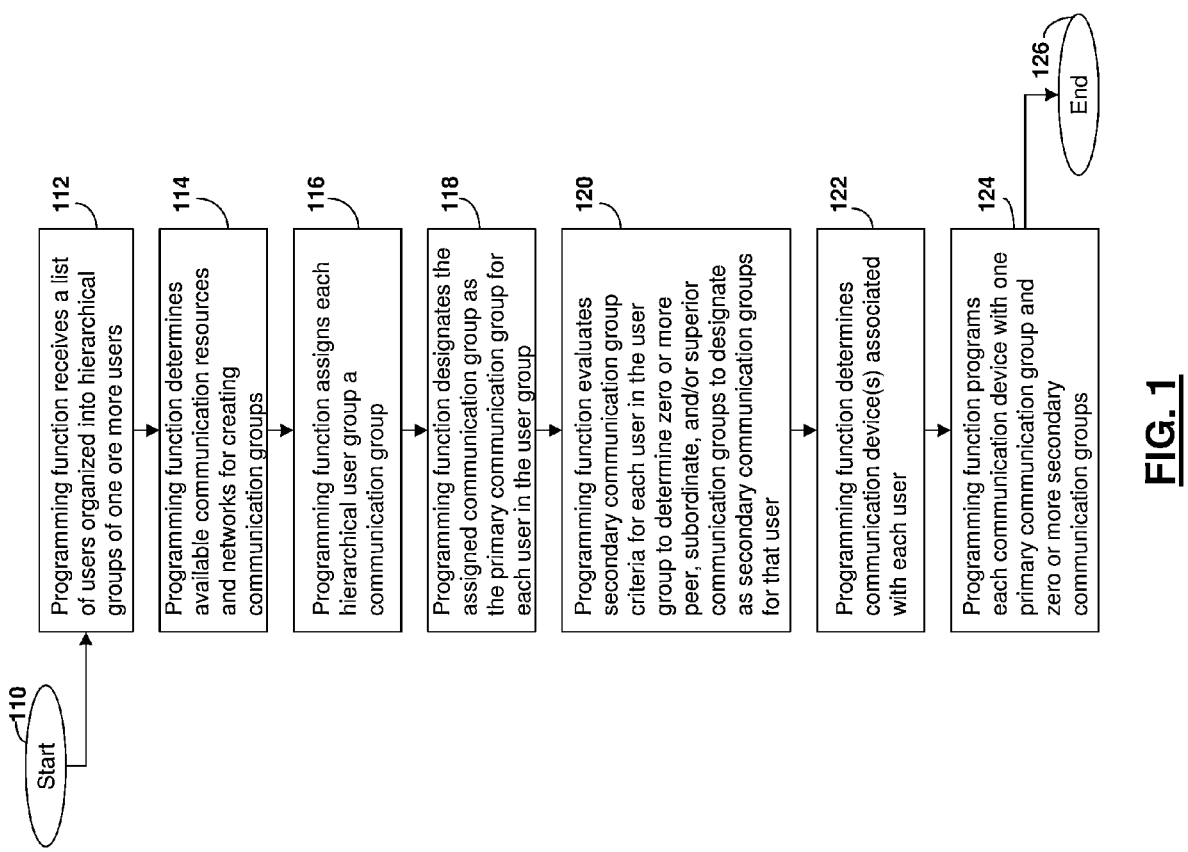
FIG. 1 shows a flowchart for programming communication devices using a programming function in accordance with embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments disclosed herein enable automatic programming of communication groups to communication devices whose operating users are arranged into a hierarchy of user groups. The present invention associates users groups in the hierarchy with available communication resources and programs communication devices with the appropriate communication network information to effect communication, as detailed herein. The present invention permits automatic programming of primary and/or secondary communication groups based on hierarchical user groups. Embodiments of the disclosed method include a user interface permitting the organization of users into such a hierarchy. Inventive arrangements for automatically programming primary and/or secondary communication groups, based on user groups of users, may be applied to any situation in which users are organized in a hierarchical, grouped, fashion.

FIG. 1 shows a flowchart for programming communication devices using a programming function in accordance with embodiments disclosed herein. The programming function is implemented in firmware, software, as an electronic circuit, or combinations thereof, to cause a set of one or more machines to take actions as disclosed herein. The flow chart starts 110 with a programming function of a device receiving a list of users organized into user groups of one or more users (i.e., a user group), shown by step 112. In a business situation, the list of users may be, for example, a list of employees organized into user groups by job function or position. In a public safety incident situation, the list of users may be, for example, a list of first responders organized into user groups by role, task assignment, or agency. In step 114, the programming function determines a list of available communication resources (e.g., channels, frequencies, multicast groups, talkgroups, etc.) and communication networks (e.g., narrowband Land Mobile Radio (LMR), broadband LTE, etc.). In step 116, the programming function assigns each user group, identified in step 112, a communication group from the list of available communication resources, identified in step 114. In step 118, the programming function designates, for each user in the user group, the assigned communication group as that user's primary communication group. In step 120, the programming function evaluates hierarchical-based criteria to determine appropriate secondary communication groups for each user in the hierarchy. That criteria determines, based on the user's attributes, for example the user's role in the hierarchy, zero or more peer, subordinate, and/or superior communication groups to designate as secondary communication groups for that user. In step 122, the programming function determines one or more devices associated with each user in the hierarchy of users. In step 124, the programming function programs each communication device with one primary communication group and zero or more secondary communication groups. The method then ends 126 for the present iteration of the method.

The criteria by which secondary communication groups are selected for a user is always hierarchical in nature, and reflects the hierarchical nature of the user groups. The specific criteria as to which subordinate, peer, and superior communication groups are selected as secondary communication groups for a given user is, however, situation or organization dependent. The specific criteria to determine which subordinate, peer, or superior communication groups are selected may be based on a specific user's role, rank, task, position, assignment, and/or the hierarchical position of that user's group with respect to subordinate, peer, and superior groups. The secondary communication group selection criteria may be programmed or specified using known means in the art. For example, an administrator may program hierarchical criteria into a database using a web interface.

As used herein, a user refers to a human having an assigned role, rank, task, position, assignment, or other attribute which can be used to group users into user groups of users, or user groups. For example, the user can be a first responder performing the duty of perimeter control in an Incident Command System (ICS), wherein that user is grouped with other users also performing the duty of perimeter control.

A hierarchy of users includes an organization of users wherein users can be grouped into one or more user groups, organized around a common attribute, where at least one user group is subordinate, peer, or superior to another user group in a hierarchical fashion. Generally, a hierarchy includes a leader and one or more subordinates who may or may not be peers.

The communication device refers to a land mobile radio (LMR), a Smart Phone, a mobile phone, a PDA, a tablet, a laptop, a Mobile Data Terminal, or any other communication device operating on a wired or wireless communication network, associated with one of the users in the hierarchy, and capable of communicating with other devices using one or more communication groups. Users may be assigned to and associated with one or more communication devices through any means known in the art, including device login, preconfigured user/device association table, biometric association, Bluetooth association, and the like.

A communication group is a logical resource of a communication network which permits a user to transmit multimedia information to one or more recipients. Multimedia information transmitted to a communication group may include Push-To-Talk (PTT) talk bursts, video, images, text, web pages, voice conversations, and the like. Communication network resources used to construct a communication group may include a frequency, channel, bearer, MBMS resource, and the like. Communication groups may be identified by a number, name, alias, frequency, channel, multicast address, MBMS identifier, and the like. A communication group may be embodied as a Talk Group on certain communication networks, such as a LMR network. Communication devices may be capable of joining or affiliating to one or more communication groups simultaneously. In some system configurations (e.g., LMR), a communication device may join (i.e., affiliate) to one primary communication group (e.g., a Talk Group), and monitor (i.e., scan) zero or more secondary communication groups (e.g., Talk Groups). In other system configurations (e.g., Push-To-Talk over Cellular (PoC)), communication devices may join or be joined to both primary and secondary communication groups. Communication groups may further be associated with access permissions, such that some users, dependent on an attribute such as role, may be allowed to only receive, or transmit, or transmit and receive information from other users in the same or different groups.

The communication network refers to a wired or wireless narrowband, wideband, or broadband network with resources which can be allocated to form communication groups. The communication network may operate in a peer-to-peer mode, or it may operate with a repeating infrastructure, or it may operate utilizing a combination of the two modes. Information may be unicast or multicast to recipients in a communication group. Communication groups may span and/or communication between one or more communication networks using appropriate gateways to facilitate interoperability. Examples of communication networks include APCO Project 25, TETRA, LTE, WiMAX, WiFi, and the like.

The programming function is used to determine appropriate primary and secondary communication groups for a given communication device, and subsequently program those devices with primary (i.e., affiliated) and secondary (i.e., scan) communication groups. The programming function is a function implemented by one or more computers, electronic devices, or machines. Such devices may include a portable device, a server located in a command van, a back-end server, and other such computing devices. In some embodiments (e.g., LMR), the communication devices themselves are programmed with a primary communication group and a list of secondary communication groups. In other embodiments, a server which facilitates multimedia communication (e.g., a PoC server) is programmed with a primary communication group and a list of secondary communication groups for all communication devices provisioned on a system. Programming may be facilitated via a wired or wireless connection from the device hosting the programming function to the device or server being programmed Examples of wired connections which facilitate programming include Ethernet, USB, RS232, and the like. Examples of wireless connections which facilitate device programming include Bluetooth, near field communication, WiFi, Over-The-Air Programming (OTAP), a Mobility Services Platform (MSP), optical QR codes, and the like.

Figure 2:
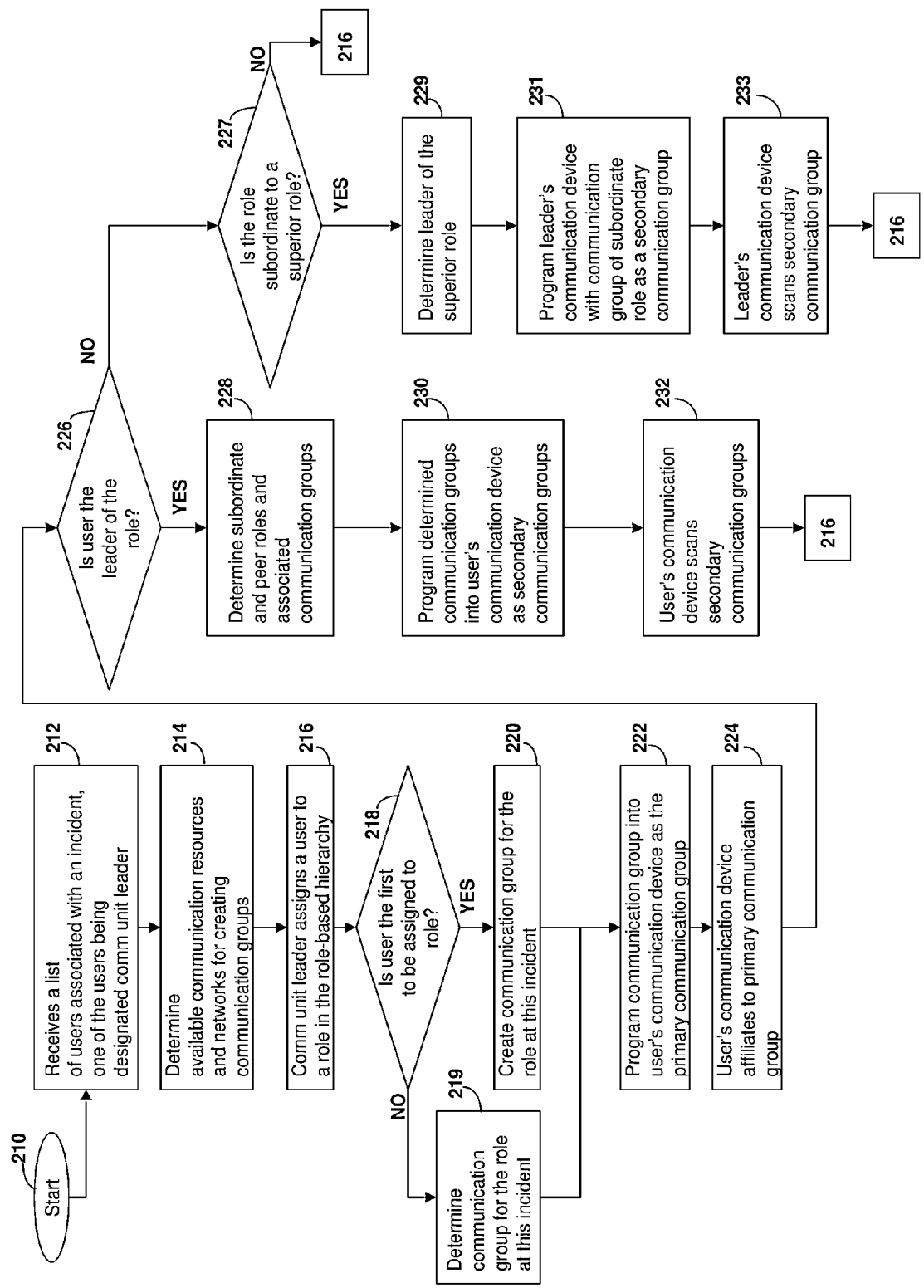
FIG. 2 shows a flowchart for programming communication devices using a programming function in accordance with embodiments disclosed herein.

FIG. 2 shows a flowchart for the creation and assignment of communication groups in accordance with embodiments disclosed herein. The flowchart starts 210 with receiving a list of users 212, associated with an incident, to be arranged in a hierarchy, with one user being designated the communications unit leader (i.e., COM-L). During incident preparation and/or response an Incident Commander (IC) and Communications Unit Leader (COM-L) are often assigned. One of the functions of the COM-L is to align communications based on the type of incident and roles involved. In step 214, a list of available communication resources (e.g., channels, frequencies, multicast groups, talkgroups, etc.) and communication networks (e.g., narrowband LMR, broadband LTE, etc.) is determined. In step 216, the COM-L assigns users to roles in a role-based hierarchy. If a user is the first one assigned to a specific role (218), a communication group is created for the role, as shown by step 220. If the user is not the first assigned to the role, an existing communication group is determined for the role in step 219. In step 222, communication device(s) of the user are programmed with the identified communication group as the primary communication group. In step 224, the user's communication device affiliates to the primary communication group.

If the user is the leader of the role (226), the communication groups of subordinate and peer roles are determined in step 228. In step 230, the determined communication groups are programmed into the user's communication device(s) as secondary communication groups. In step 232, the user's communication device begins scanning the secondary communication groups. Execution then resumes at step 216 until all users associated with the incident are allocated to roles.

Alternatively, if the user is not the leader of the role (226), then it is determined (227) if the user's role is subordinate to a superior role established in the role-based hierarchy. If not, then execution resumes at step 216 until all users associated with the incident are allocated to roles. If the user's role is subordinate to a superior role, then the leader of that superior role is determined (229). In Step 231, the determined leader's communication device is programmed with the communication group determined in 219/220 as a secondary communication group. In step 233, the leader's communication device begins scanning the secondary communication group. Execution then resumes at step 216 until all users associated with the incident are allocated to roles. Although FIG. 2 illustrates an embodiment whereby a leader manually assigns users to roles in a hierarchical fashion, it can be appreciated that such a step may be automated. In another embodiment, not shown, roles may be dynamically and automatically assigned based on pre-configured organization information. For example, responders may be automatically assigned to roles at an incident based on their agency affiliation, experience, skill set, task, assignment, role, etc.

Figure 3:
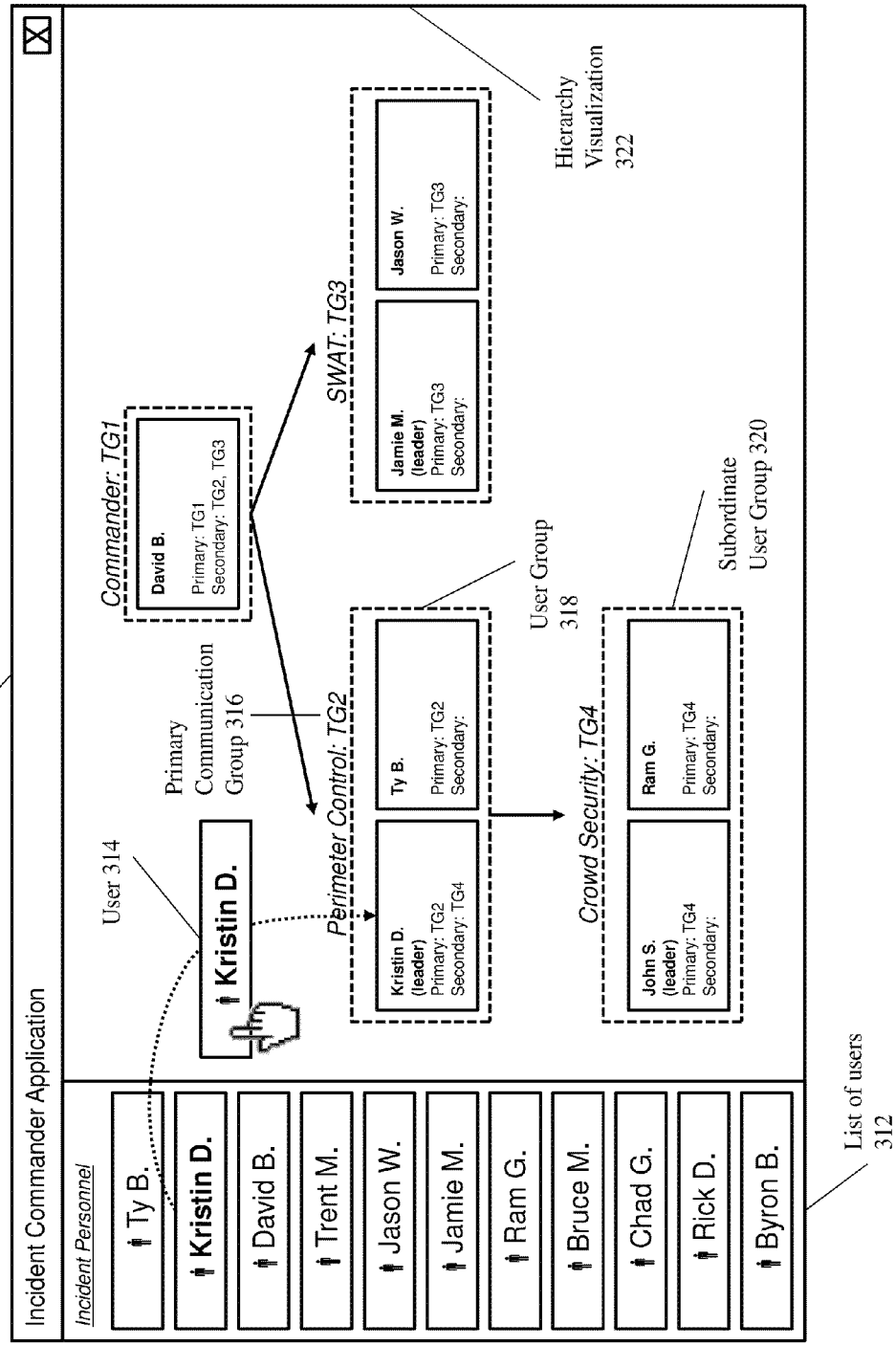
FIG. 3 is a block diagram of an interface for enabling automatic programming of communication groups in accordance with embodiments disclosed herein.

FIG. 3 is a block diagram of an exemplary user interface 310 for enabling automatic programming of communication groups associated with a communication network in accordance with embodiments disclosed herein. The illustrations are shown in context of an incident, but concepts shown herein are applicable to any situation in which users with communication devices can be organized into hierarchical user groups. The user interface 310 is for illustrative purposes only and the invention is not to be construed as limited to the explicit elements and arrangements shown therein.

Interface 310 may be screens of an Incident Command System (ICS) command application. For example, interface 310 can be Rich Internet Application (RIA) interfaces presented within a Web browser which can be utilized at an Incident Command Post (ICP) to organize resources during an incident. Interface 310 presents a list of users 312 which are assigned to the incident. An incident commander can use interface 310 to drag users into a role-based hierarchy of user groups 322. Each group is assigned a primary communication group 316.

In one example, user 314 may be dragged into user group 318. In practice with the teachings of this invention, user 314 is assigned the primary communication group TG2, assigned to user group 318. User 314 is subsequently identified as the leader of user group 318 by the COM-L. In accordance with a pre-configured, hierarchical-based criteria, the primary communication group TG4 assigned to subordinate user group 320, becomes a secondary communication group for user 314.

It should be appreciated that the interface 310 can facilitate rapid and automatic programming of primary and secondary communication groups based on a hierarchy of user groups, such as an ICS structure.

As used herein, an incident can include an unplanned situation and/or a planned situation. For example, an incident can be a natural disaster or a large civic event. In one instance, the users can be associated with a public organization, including, but not limited to, a public safety service, a public transportation service, a public utility service, and the like. In one embodiment, the incident can be associated with an Incident Command System of a National Incident Management System (NIMS). That is, an ICS can be used across multiple agencies to coordinate efforts and/or provide mutual aid. Communication devices may be used be users before, during, and/or after the incident.

Figure 4:
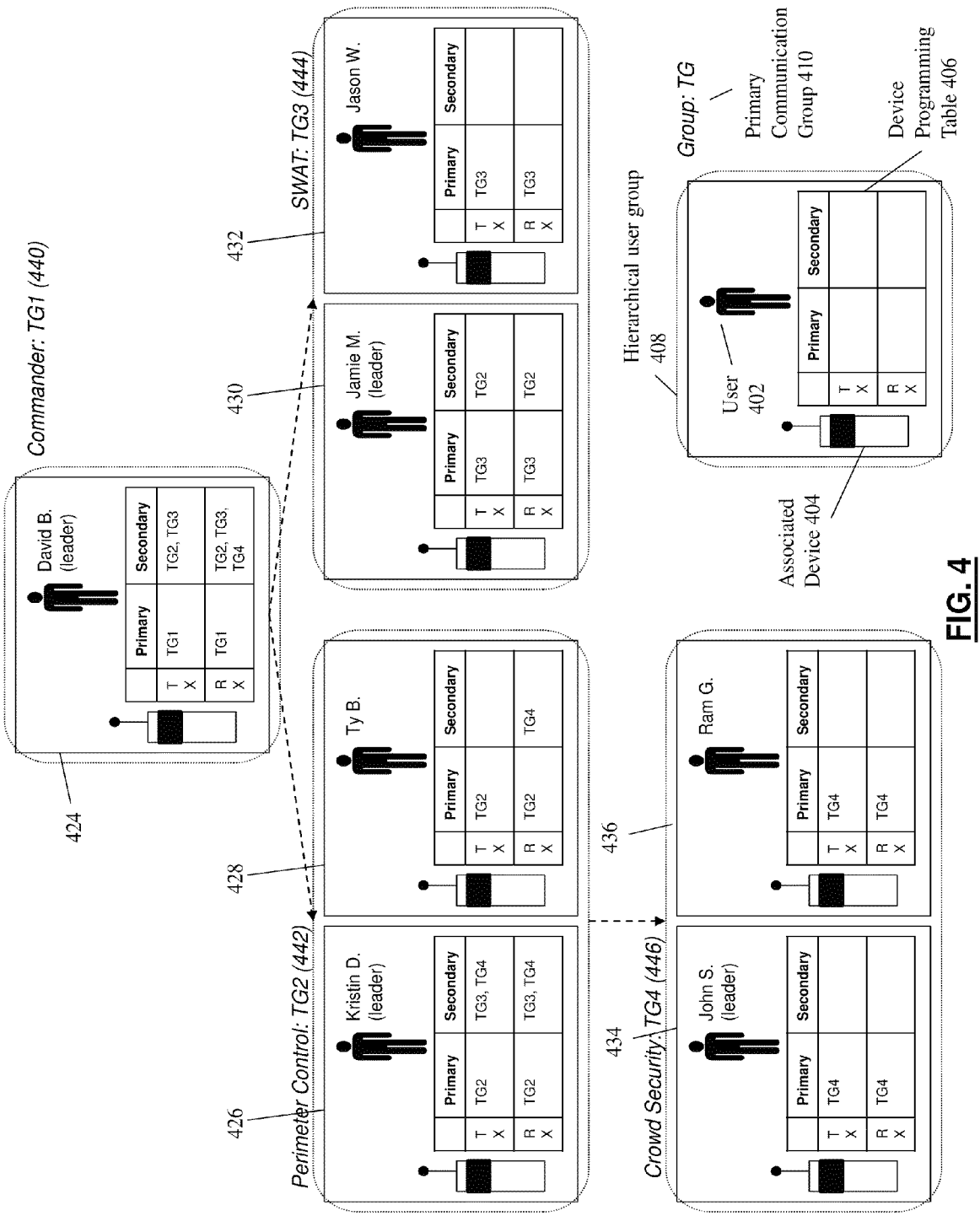
FIG. 4 shows an exemplary communication hierarchy aligned to the role-based hierarchy of users operating at a large scale hostage incident.

FIG. 4 depicts a more complicated example of the criteria used to determine secondary communication groups. The users of FIG. 4 have already been assigned to role-based user groups (408) at a large-scale incident in accordance with the teachings of this invention. Each user 402 is associated with a communication device 404. Each hierarchical user group 408 has been assigned a primary communication group 410. Each communication device has been programmed with primary and secondary communication groups, in accordance with the teachings of this invention, per programming table 406. Talk Group 1 (TG1) (440) is the primary communication group for the Commander (424). TG2 (442) is the primary communication group for those users assigned to the role of Perimeter Control. TG3 (444) is the primary communication group for those users assigned to role of SWAT. TG4 (446) is the primary communication group for those users assigned to the role of Crowd Security.

The pre-configured, hierarchical-based secondary communication group selection criteria (not shown) utilized in this example dictates that the leaders of user groups should have transmit and receive privileges with their own (primary) user group, all directly subordinate user groups (secondary), and all peer user groups (secondary). Directly subordinate user groups are those considered to be exactly one level subordinate in the hierarchy, but not inclusive of user groups further subordinate (e.g., two levels subordinate) in the hierarchy. Peer user groups are those considered to be at the same level as a user's group in the hierarchy. The selection criteria further dictates that members of a user group should have receive-only privileges on groups directly subordinate to their own, but not inclusive of groups subordinate to those groups (e.g., two levels subordinate). The selection criteria further dictates that leaders of user groups should have receive-only privileges on groups two or more levels subordinate in the organization.

In accordance with the pre-configured secondary communication group selection criteria, David B.'s (424) associated communication device has transmit and receive privileges on his primary communication group (TG1), as well as transmit and receive privileges on the communication groups (TG2 and TG3) associated with user groups directly subordinate to him (442 and 444). David B. also has receive-only privileges on the Crowd Security group (446) two levels subordinate to him.

In a similar fashion, Kristin D.'s (426) associated communication device has transmit and receive privileges on her primary communication group (TG2), as well as transmit and receive privileges on the communication groups (TG4 and TG3) associated with user groups directly subordinate and peer to her (446 and 444).

Ty. B (428), who is not a leader, has transmit and receive privileges on his primary communication group (TG2), and receive-only privileges on the communication group (TG4) directly subordinate to him (446).

John S. (434) has transmit and receive privileges on his primary communication group (TG4). Although John S. is a leader, because there are no peer or subordinate user groups to his own, John S. does not have transmit or receive privileges on any other communication group.

Readers will appreciate that the respective communication devices of other users (430, 432, 436) depicted in FIG. 4 are programmed in a similar fashion. Further, readers will appreciate that the various communication groups described herein may comprise, for example, Project 25 compliant talkgroups or LMR talkgroups or LMR data groups (for example, when implemented in a communication network that is a Project 25 compliant network) or PoC or multimedia groups (for example, when implemented in a communication network that is a broadband network).

Figure 5:
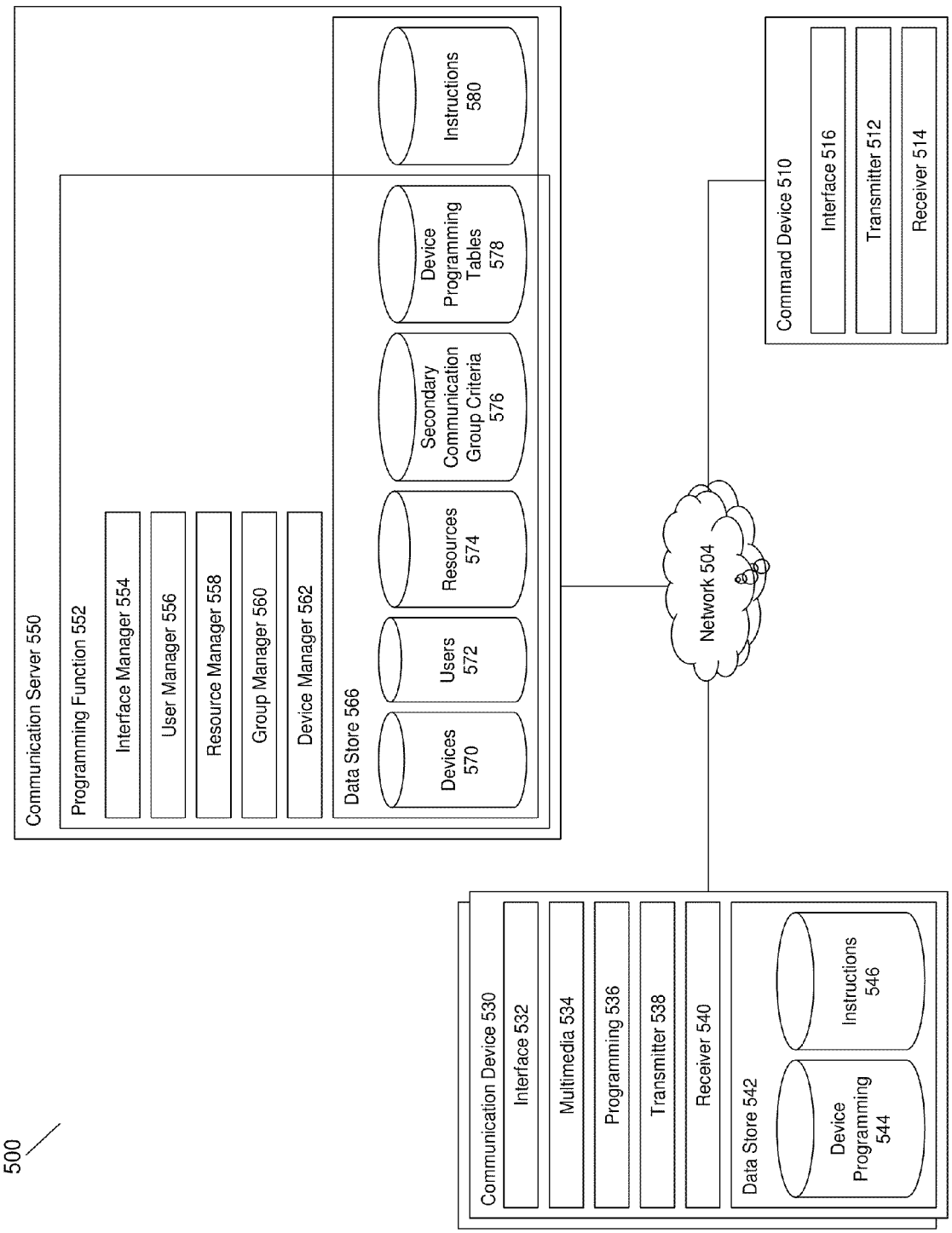
FIG. 5 is a system schematic diagram for enabling automatic programming of communication groups associated in accordance with embodiments disclosed herein.

FIG. 5 is a system schematic diagram for enabling automatic programming of communication groups, in accordance with embodiments disclosed herein. System 500 is comprised of a communication server 550, one or more communication devices 530, a command device 510, and other entities not shown for brevity. System 500 can be communicatively linked via wired or wireless network 504. Network 504 can be, for example, a Project 25 narrowband communication network.

In system 500, communication server 550 can be a hardware/software element for facilitating the programming of communication devices 530. Communication server 550 functionality can include, but is not limited to, functions such as encryption, session management, group programming, computer program instructions 580, and the like. Server 550 can be, for example, a push-to-talk (PTT) server, an Internet Multimedia Service (IMS) server, a P25 Controller, and the like. It should be appreciated that server 550 can include regionally split high availability (HA) servers, in which the primary core servers can be located geographically remote from secondary core servers. Computer program instructions 580 can include executable code able to control the behavior of communication server 550 such as programming function 552, and the like.

Programming function 552 can be a hardware/software function which facilitates the organization of users into a hierarchy of user groups, assignment of communication groups to user groups, association of devices with users, execution of secondary communication group selection criteria to determine appropriate secondary communication groups, and programming of primary and secondary communication groups to communication devices. Programming function 552 can utilize an Over-The-Air Programming (OTAP) function provided by network 504 to program communication devices 530. Although depicted in system 500 as a single software entity executing on a single communication server 550, it is appreciated that the functions of programming function 552 could be decomposed and distributed across multiple servers residing within and external to network 504. The programming function 552 is comprised of the following components:

Data store 566 can be a hardware/software component able to persist one or more databases, file stores, and the like. Data store 566 can be directly attached storage, a Storage Area Network (SAN), Network Attached Storage (NAS), and the like. Data store 566 can conform to a relational database management system (RDBMS), object oriented database management system (OODBMS), and the like. Data store 566 can be communicatively linked to communication server 550 and programming function 552 in one or more traditional and/or proprietary mechanisms. In one instance, data store 566 can be a component of a Structured Query Language (SQL) database.

Interface manager 554 can be a hardware/software element for organizing a list of users into hierarchical user groups, and/or assigning users to roles. An example of such an interface is provided in FIG. 3. Interface manager 554 may utilize user manager 556 to determine a list of users and attributes, and group manager 560 to assign users to hierarchical user groups.

User manager 556 may provide user lists, user/device associations, and user attributes. User manager 556 may utilize a users database 572 to store and retrieve such information.

Resource manager 558 provides or creates available communication resources on a network 504. Resource manager 558 may utilize a resources database 574 to store and retrieve such information.

Group manager 560 determines the primary communication group for each user. Group manager 560 also evaluates the secondary communication group criteria stored in a secondary communication group criteria database 576, and determines appropriate secondary communication groups for each user. Group manger 560 stores the resulting information in device programming tables 578.

Device manager 562 facilitates programming of communication devices based on the device communication tables 578. Device manager 562 may utilize device information stored in a devices database 570 to determine the address, network, etc. for programming the communication device. A multitude of device managers may be present to support different types of communication devices 530.

It is appreciated that programming function 552 may comprise other components, not shown, as required to perform its operation.

System 500 also comprises one or more communication devices 530. Communication device 530 can be one or more electronic devices associated with a communication network (e.g., network 504) and a user. Device 530 can include, but is not limited to, a cellular phone, a two-way radio, a smart phone, and the like. In one instance, device 530 can be an Association of Public Safety Communication Officials (APCO) Project 25 compliant device.

Device 530 can include, but is not limited to, transmitter 538, receiver 540, computer program instructions 546, and the like. Computer program instructions 546 can include executable code able to control the behavior of device 530 such as interface 532, multimedia 534, and programming 536.

Interface 532 presents and ingests multimedia information to the operating user.

Multimedia 534 is responsible for formatting and addressing inbound and outbound multimedia information to and from other users in communication groups. In some embodiments, multimedia 534 is also responsible for affiliation or scanning of appropriate communication groups.

Programming 536 receives a device programming table, stores it in a non-volatile device programming database 544 if necessary, and instructs multimedia 534 to affiliate or scan appropriate primary and secondary communication groups. Programming 536 may support a variety of interfaces for receiving a device programming table, including OTAP.

System 500 also comprises one or more command devices 510. Command device(s) 510 can be a computing device configured to facilitate the organization, management, and/or programming of communication device 530 (which may be a responder device) within an incident. Command device(s) 510 can include, but is not limited to, a transmitter 512, a receiver 514, an interface 516, and the like. In one instance, command device(s) 510 can operated by a communication unit leader (COM-L) associated with a hierarchical organization of user groups. For example, command device(s) 510 can be a tablet device utilized by an incident commander deployed at an incident site.

As used herein, transmitter 512, 538 can include an electronic component which, with the aid of an antenna can produce radio waves which can broadcast information. Receiver 514, 540 can include an electronic component able to receive radio waves and convert the information into a useable form. Interface 516, 532 can include, but is not limited to, a graphical user interface, a voice user interface, a text based interface, a touch screen based interface, a mixed mode interface, and the like.

Drawings presented herein are for illustrative purposes only and should not be construed to limit the invention in any regard. System 500 can include, but is not limited to, LMR systems and/or networks (e.g., network 504), broadband radio systems and/or networks (e.g., network 504), mobile radios, radio frequency (RF) towers, dispatch console workstations, core servers to enable voice and data communication between RF towers, and the like.

Figure 6:
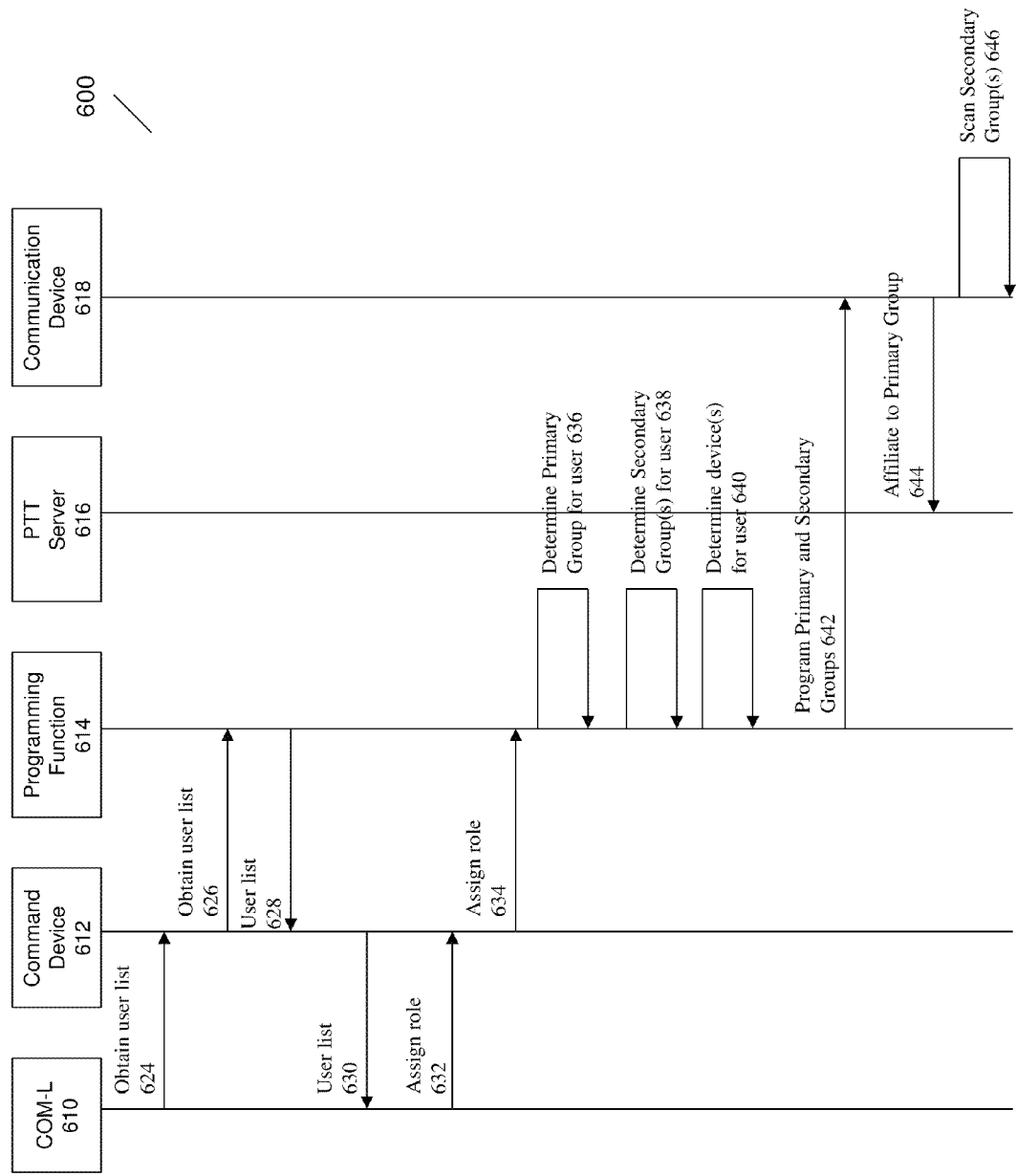
FIG. 6 is a flow diagram for enabling automatic programming of communication groups in accordance with embodiments disclosed herein.

FIG. 6 is a flow diagram for enabling automatic programming of communication groups, in accordance with embodiments disclosed herein. Flow 600 shows communication between the COM-L 610, command device 612, programming function 614, PPT server 616, and a communication device 618. It should be understood that each action 624-644 of flow 600 can be followed with an acknowledgement message indicating success of the action, or other intermediary messages.

Flow 600 beings when a COM-L obtains a list of users associated with an incident via a user interface directive 624 to a communication device of the COM-L, that is, command device 612. An incident may be identified by an incident ID, location, etc. Command device 612 in turn requests the user list from a programming function 614 implemented by a communication server, such as programming function 552 implemented by communication server 550, via directive 626. Programming function 614 responds with user list 628, which is presented to the COM-L (630).

The COM-L then selects a user to assign to an incident role via directive 632 to the user interface of command device 612. Command device in turn relays the request to assign a user to a role via directive 634. A user may be identified by their name, login alias, login id, or the like.

Upon receipt of directive 634, programming function 614 determines a primary communication group for the selected user (636). Programming function 614 also evaluates the secondary communication group criteria for the user, and determines zero or more secondary communication groups for the selected user (638).

The programming function then determines the associated communication device(s) 618 for the selected user (640).

The programming function then programs the communication device 618 with the identified primary and secondary communication groups (642).

Upon receipt of the programming directive 642, communication device 618 affiliates to the indicated primary communication group (644). Communication device also begins scanning secondary communication groups (646).

Figure 7:
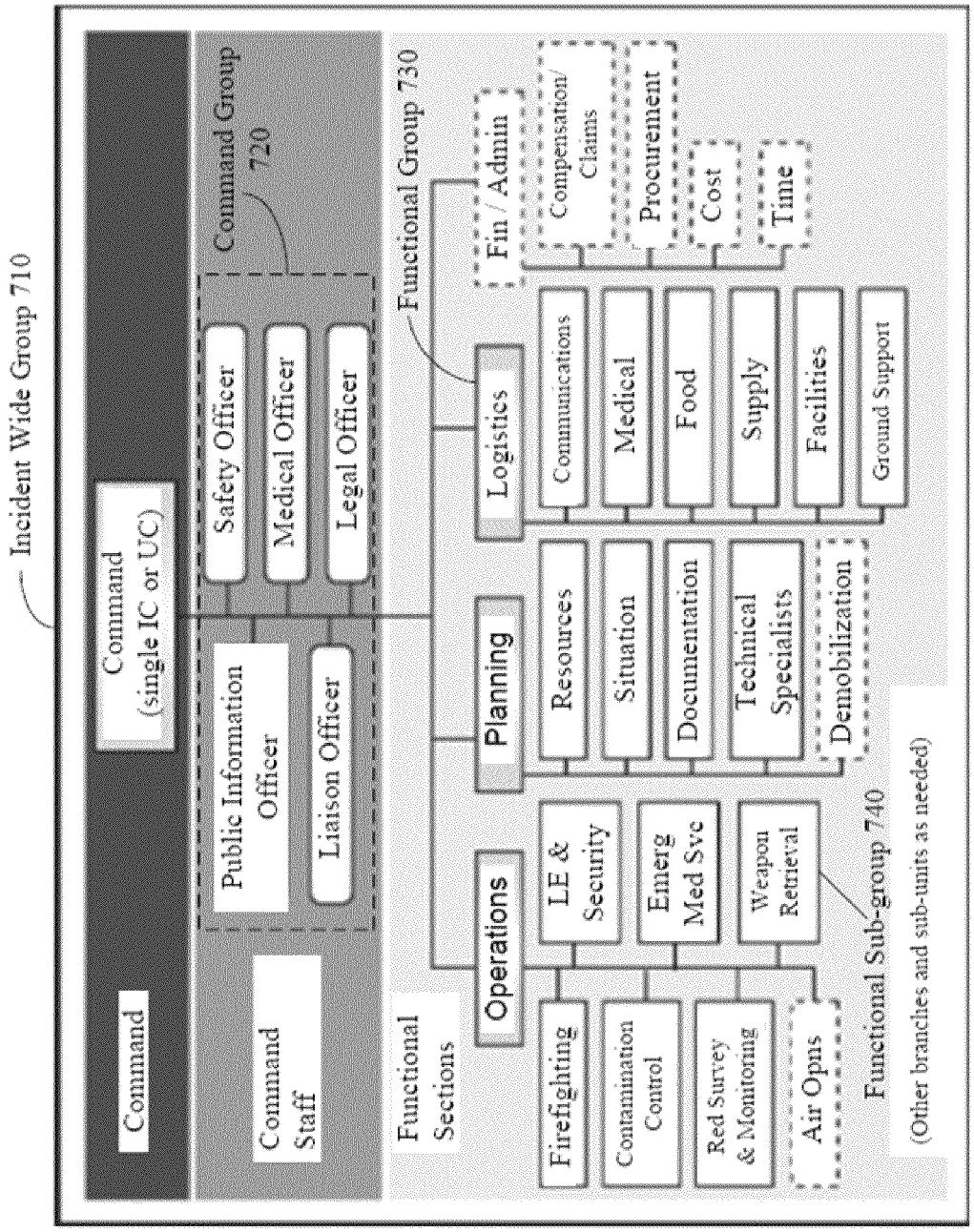
FIG. 7 is a block schematic diagram illustrating a chart associated with a role-based hierarchy in accordance with embodiments disclosed herein.

FIG. 7 is a block schematic diagram illustrating an organizational chart 700 associated with an incident command system hierarchy, in accordance with embodiments disclosed herein. Organizational chart 700 can comply with an ICS-100 level National Incident Management System organizational chart. Chart 700 can include, but is not limited to, an incident wide group 710, a command group 720, a functional group 730, a functional sub-group 740, and the like. Chart 700 can be utilized in the context of interface 310, method 200, system 500, and/or flow 600. Chart 700 is used for illustrative purposes only, and any hierarchy of user groups can be utilized with inventive arrangements disclosed herein.

Embodiments of the disclosure address a need for aligning group communication with a hierarchy by leveraging the standardized nature of LMR and Broadband devices permitting dynamic programming of device communication groups. In embodiments of the invention, communication groups can be dynamically programmed based on a hierarchy established for disaster response. For example, in a disaster in which the National Incident Management System (NIMS) is used, the organization structure defined by the incidence Command System (ICS) can be linked to communication devices used by users associated with user groups within the ICS structure. Communication groups can be automatically defined based on the ICS structure, so that a leader in a superior user group can use one of these dynamically established communication groups to immediately communicate with responders in subordinate and peer user groups. By directly establishing communication groups aligned to the ICS structure (and in cases visually showing the structure and communication group assignments in a user interface), effective response groups can be rapidly established and easily maintained. In disaster response situations, which are prone to be chaotic, the disclosed tool ensures effective communication are seamlessly established and maintained.

In one embodiment, the disclosure resolves a need to rapidly align all communication (e.g., LRM, Broadband, PTT, video, data, etc.) with an ICS organizational chart. That is, an ICS commander (who is not necessarily a CAD dispatcher) assigns resources in the field from one or more agencies to an "organizational chart" tailored to the ICS incident at hand. Per the disclosure, several dynamic communication groups may be created or allocated based on the role of responders in the ICS. These groups are associated with users as primary and secondary communication groups based on the hierarchical nature of the organizational chart coupled with associated selection criteria. The identified primary and secondary communication groups are dynamically programmed into applicable LMR and broadband devices. Communication are aligned based on the hierarchy of user groups within the ICS, with superior groups in the ICS structure generally being able to scan subordinate communication groups (i.e., hierarchy).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Any published standards or other well-established industry practices referred to herein include only the teachings and information contained in and/or described by such publications as of the time of filing the present application.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments, for example, the communication devices, including command devices, and communication servers, including PTT servers, described herein, may be comprised of one or more generic or specialized processors (or "processing devices"), such as microprocessors, digital signal processors, customized processors and field programmable gate arrays (FPGAs), and one or more memories, such as computer-readable storage medium having computer readable code stored thereon as described below, that maintain data and program instructions (including both software and firmware) that control the one or more processors to implement, in conjunction with certain non-processor circuits, some, most, or all of the functions of the methods and/or apparatuses described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented, at least in part, as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for programming communication devices associated with groups of users arranged into a hierarchy comprising:
   determining a group of users having a similar role within an organizational hierarchy;
   assigning a primary communication group to the users having the similar role within the organizational hierarchy;
   determining a communication device assigned to a user in the group of users;
   assigning the primary communication group to the communication device said communication device associated with the user for communication using a network;
   determining a secondary communication group for the communication device based on the user's status as a superior, peer, or subordinate within the hierarchy, wherein the secondary communication group is a primary communication group for at least one other user within the hierarchy; and
   programming the communication device with the determined primary and secondary communication groups.

2. The method of claim 1, wherein the hierarchy is a role-based hierarchy established for incident response, wherein the user is a responder for incident, wherein the group of users having the similar role is determined by the user's role in the incident, wherein the communication device is a responder device.

3. The method of claim 1, wherein the step of determining a group of users having the similar role for a user enrolled in a hierarchy further comprises a command device, assigned to a human, assigning users to group of users having the similar roles within the hierarchy.

4. The method of claim 1, wherein the step of determining a group of users having the similar role for a user enrolled in a hierarchy further comprises determining a group of users having the similar role comprised of users sharing a common attribute.

5. The method of claim 4, wherein the common attribute is role.

6. The method of claim 1, wherein the communication network is a Project 25 compliant network, wherein the primary and secondary communication groups are Project 25 compliant talkgroups.

7. The method of claim 1, wherein the communication network is a broadband network, wherein the primary and secondary communication groups are Push-to-Talk over Cellular (PoC) groups.

8. The method of claim 1, where communication on the secondary communication group is restricted based on user role.

9. The method of claim 7, where the restriction is receive-only.

10. The method of claim 1, where the programming of a secondary communication group comprises configuring a communication device to scan a talkgroup.

* * * * *